United States Patent
Jalil et al.

(10) Patent No.: US 9,019,888 B2
(45) Date of Patent: Apr. 28, 2015

(54) METHOD AND SYSTEM FOR COMMUNICATING A PLURALITY OF PACKETS IN MULTICAST BROADCAST SERVICE (MBS) COMMUNICATION NETWORK

(75) Inventors: Rehan Jalil, San Jose, CA (US); Mustafa Ergen, Oakland, CA (US)

(73) Assignee: WiChorus Inc., San Jose, CA (US)

( * ) Notice: Subject to any disclaimer, the term of this patent is extended or adjusted under 35 U.S.C. 154(b) by 1290 days.

(21) Appl. No.: 11/741,776

(22) Filed: Apr. 30, 2007

(65) Prior Publication Data

US 2007/0253360 A1 Nov. 1, 2007

Related U.S. Application Data

(60) Provisional application No. 60/796,791, filed on May 1, 2006.

(51) Int. Cl.
*H04W 4/00* (2009.01)
*H04L 12/841* (2013.01)
*H04W 72/12* (2009.01)

(52) U.S. Cl.
CPC ............ *H04L 47/28* (2013.01); *H04W 72/121* (2013.01)

(58) Field of Classification Search
USPC .................. 370/312, 318, 328, 335, 412, 390
See application file for complete search history.

(56) References Cited

U.S. PATENT DOCUMENTS

| | | | |
|---|---|---|---|
| 7,469,297 B1* | 12/2008 | Kostoff et al. | 709/236 |
| 2002/0110134 A1* | 8/2002 | Gracon et al. | 370/412 |
| 2002/0186652 A1* | 12/2002 | Popovich | 370/218 |
| 2003/0112778 A1* | 6/2003 | Lundby | 370/335 |
| 2005/0157679 A1* | 7/2005 | Dulin et al. | 370/330 |
| 2006/0013168 A1* | 1/2006 | Agrawal et al. | 370/335 |
| 2006/0146745 A1* | 7/2006 | Cai et al. | 370/328 |
| 2006/0239264 A1* | 10/2006 | Kang et al. | 370/390 |
| 2006/0251006 A1* | 11/2006 | Oliver | 370/328 |

* cited by examiner

*Primary Examiner* — Wayne Cai
(74) *Attorney, Agent, or Firm* — Hamilton, Brook, Smith & Reynolds, P.C.

(57) ABSTRACT

A method and system for communicating a plurality of packets in the MBS communication network is provided. The method includes determining if one or more packets in the plurality of packets received at one or more controllers are MBS packets. The method further includes encoding one or more MBS frames using one or more packets, if each packet in one or more packets is a MBS packet. Thereafter, one or more MBS frames are transmitted from each BTS to a plurality of Mobile Stations (MS) at a predetermined Take Off Time (TOT) based on a predetermined criterion.

13 Claims, 8 Drawing Sheets

METHOD AND SYSTEM FOR COMMUNICATING A PLURALITY OF PACKETS IN MULTICAST BROADCAST SERVICE (MBS) COMMUNICATION NETWORK

RELATED APPLICATIONS

Benefit is claimed under 35 U.S.C. 119(e) to U.S. Provisional Application Ser. No. 60/796,791, entitled "Method and system for centralized multicast broadcast service for OFDMA mode in IEEE 802.16e", by Rehan Jalil et al., filed May 1, 2006, which is herein incorporated in its entirety by reference for all purposes.

FIELD OF INVENTION

The invention relates generally relates to communication networks. More specifically, the invention relates to communication of a plurality of packets in a Multicast Broadcast Service (MBS) communication network.

BACKGROUND OF THE INVENTION

A MBS communication network includes one or more controllers, a plurality of Base Transceiver Stations (BTS), and a plurality of Mobile Stations (MSs). Each controller has an associated set of BTS that it serves. A controller communicates with each BTS in the associated set of BTSs and provides various services in the form of MBS packets or MBS frames, which include one or more MBS packets. Examples of the services may include, but are not limited to, video distribution, vehicle tracking, e-learning, file sharing, and weather monitoring.

In conventional systems, a MBS frame to be transmitted to each MS in the MBS communication network is transmitted by each BTS. Thereafter, the MBS frame is received by one or more MS. A MS may receive the MBS frame from one or more BTSs. Therefore, the MS may select the MBS frame, which has least errors, out of each MBS frame received from one or more BTSs and decode it. Alternately, the MS may soft combine the MBS frame received from each BTS to generate an error free MBS frame. However, in conventional systems, a MBS frame may not be transmitted from the plurality of BTSs at the same time. Thereby, leading to inefficiency in receiving an error free MBS frame.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
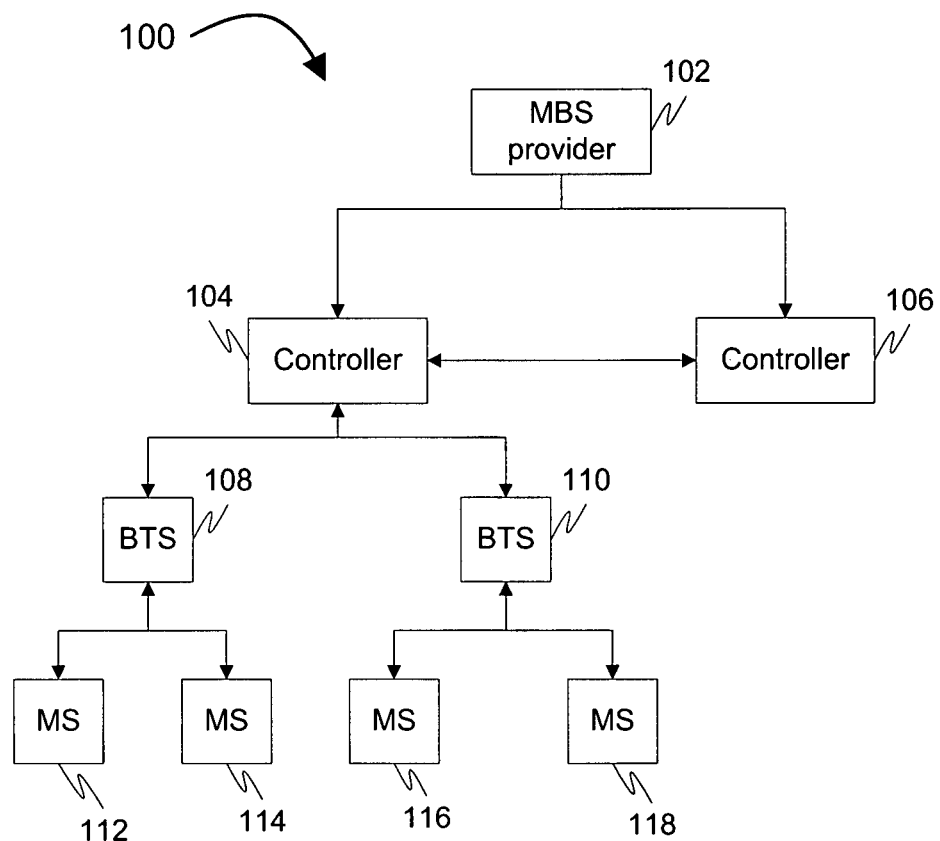
FIG. 1 is a block diagram showing an environment in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to method and system for communicating a plurality of packets in a Multicast Broadcast Service (MBS) communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and systems for communicating a plurality of packets in a Multicast Broadcast Service (MBS) communication network. In the MBS communication network, one or more MBS packets are used to encode one or more MBS frames. The MBS frames are thereafter transmitted by a plurality of BTSs at a predetermined TOT to achieve macro diversity.

FIG. 1 is a block diagram showing an environment 100 in which various embodiments of the invention may function. Environment 100 includes a MBS provider 102, one or more controllers, and a plurality of Base Transceiver Station (BTSs). MBS provider 102 communicates with one or more of a controller 104 and a controller 106 to provide MBS packets. It will be apparent to a person skilled in the art that MBS provider 102 may communicate with more than two controllers. Controller 104 and controller 106 may communicate with each other to share information. The information may correspond to one or more of, but is not limited to the link-delay estimates of each of controller 104 and controller 106 to associated BTSs and available load at associated BTSs. Controller 104 communicates with a BTS 108 and a BTS 110 associated with controller 104 to generate MBS frames using one or more MBS packets. It will be apparent to a person skilled in the art that each of controller 104 and controller 106 may communicate with one or more associated BTSs.

Thereafter, each of BTS 108 and BTS 110 transmits the MBS frames. The MBS frames transmitted by BTS 108 are received by one or more of a Mobile Station (MS) 112 and a MS 114 and the MBS frames transmitted by BTS 110 are received by a MS 116 and a MS 118.

Figure 2:
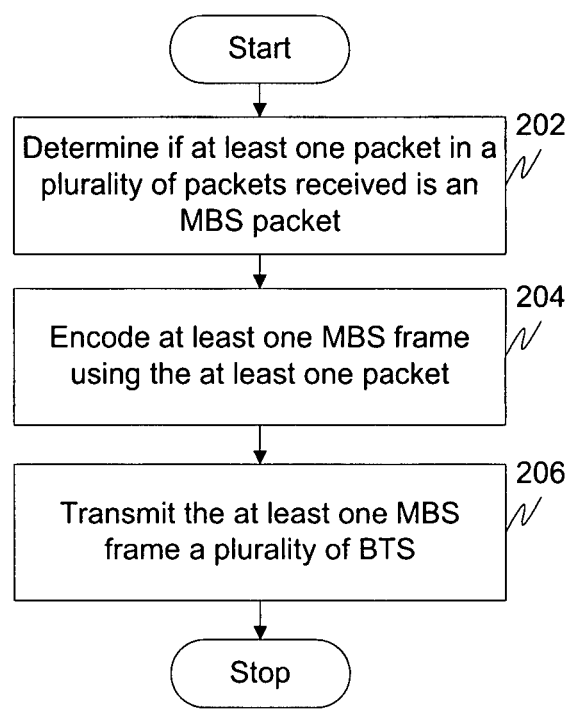
FIG. 2 is a flowchart of a method of communicating a plurality of packets in a Multicast Broadcast Service (MBS) communication network, in accordance with an embodiment of the invention.

FIG. 2 is a flowchart of a method for communicating a plurality of packets in a MBS communication network, in accordance with an embodiment of the invention. The plurality of packets to be communicated are received by one or more controller, i.e., controller 104 and controller 106. At step 202, one or more of controller 104 and controller 106 determine if one or more packets in the plurality of packets are MBS packets. If one or more packets in the plurality of packets are MBS packets provided by MBS provider 102, then at step 204, one or more MBS frames are encoded using one or more packets that are MBS packets provided by MBS provider 102. The method of encoding is further explained in detail in conjunction with FIG. 3.

After one or more MBS frames are encoded, at step 206, one or more MBS frames are transmitted from each BTS to a plurality of MSs in the MBS communication network at a predetermined Take Off Time (TOT) based on a predefined criterion. For example, BTS 108 transmits one or more MBS frames at the predetermined TOT that are received by one or more of MS 112 and MS 114. A TOT for a frame is a time of transmitting the frame from a BTS. The predefined criterion may be a master controller selected from one or more controllers encoding a MBS frame. This is explained in detail in conjunction with FIG. 4. Alternately, the predefined criterion may be each BTS encoding a MBS frame. This is explained in conjunction with FIG. 5 and FIG. 6. For transmitting a MBS frame from each BTS at the predetermined TOT, the plurality of BTSs are frame synchronized by one or more controllers. In an embodiment of the invention, each controller and each BTS has a location detection device to achieve synchronization. The location detection device, for example, may be a GPS unit. The GPS unit is used to synchronize the time in each controller and each BTS, such that each BTS transmits the MBS frame at the predetermined TOT.

Figure 3:
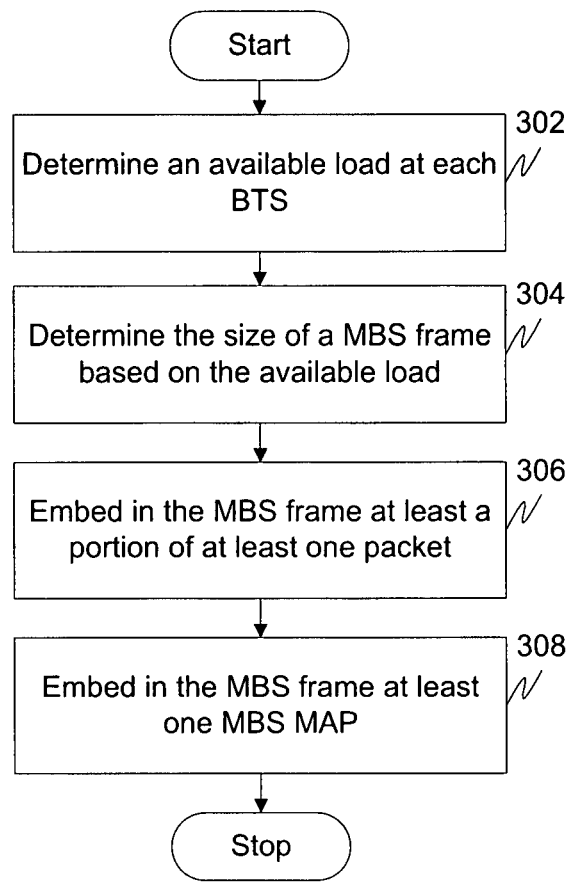
FIG. 3 is a flowchart of a method for encoding a MBS frame, in accordance with an embodiment of the invention.

FIG. 3 is a flowchart of a method for encoding a MBS frame, in accordance with an embodiment of the invention. At step 302, an available load at each BTS 108 and BTS 110 is determined. For example, an available load at each of BTS 108 and BTS 110 is determined. Thereafter, at step 304, size of the MBS frame is determined based on the available load at each BTS. A MBS frame is divided into a plurality of fragments. Each fragment corresponds to a FS. The size of the MBS frame may be determined based on an available load corresponding to a BTS, which is least as compared to available load determined at BTS 108 is less than the available load determined at BTS 110. In this case, the size of a MBS frame is determined based on the available load at BTS 108. Available load at a BTS corresponds to the size of one or more MBS packets that the BTS can receive from a controller, store for a time period, and transmit to one or more MSs. For example, for communicating one or more MBS packets, available load at each of BTS 108 and BTS 110 associated with controller 104 is determined. In an embodiment of the invention, a BTS may specify a predetermined minimum fixed allocation for MBS packets.

Thereafter, at step 306, one or more MBS portions are embedded in the MBS frame. The size of a MBS portion is equal to one or more FSs of the MBS frame. A MBS portion includes one or more parts (bits) of one or more MBS packets. If size of a MBS packet is more than a FS of the MBS frame, then the MBS packet is fragmented into one or more parts. The size of each part of the fragmented MBS packet is equal to or less than a FS of the MBS frame. This is further explained in detail in conjunction with FIG. 4, and FIG. 5.

At step 308, one or more MBS MAPs are embedded in the MBS frame. A MBS MAP includes one or more MBS DATA Information Elements (IEs) in a MBS frame. A MBS DATA IE is associated with a MBS portion and is used to determine each of configuration and the location of the associated MBS portion in the MBS frame. This is further explained in detail in conjunction with FIG. 4, and FIG. 5.

Figure 4A:
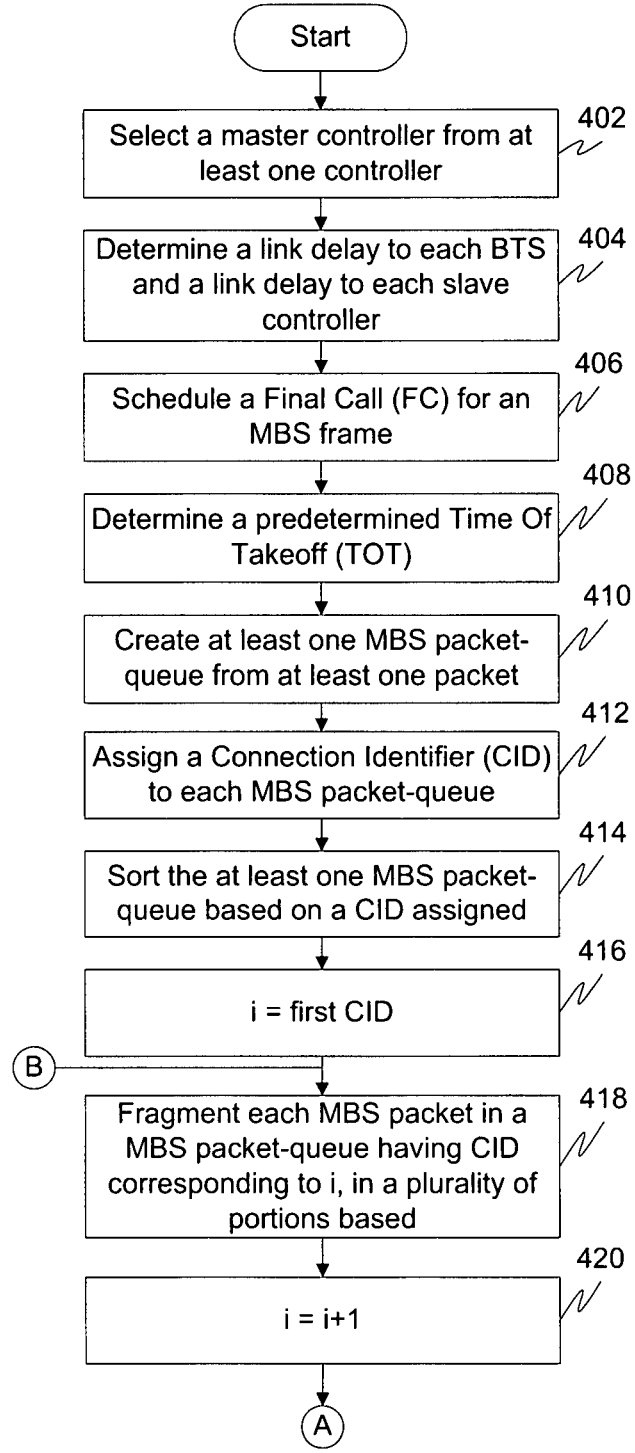
FIGS. 4A and 4B show a flowchart of a method of encoding a MBS frame in a master controller, in accordance with an embodiment of the invention.
Figure 4B:
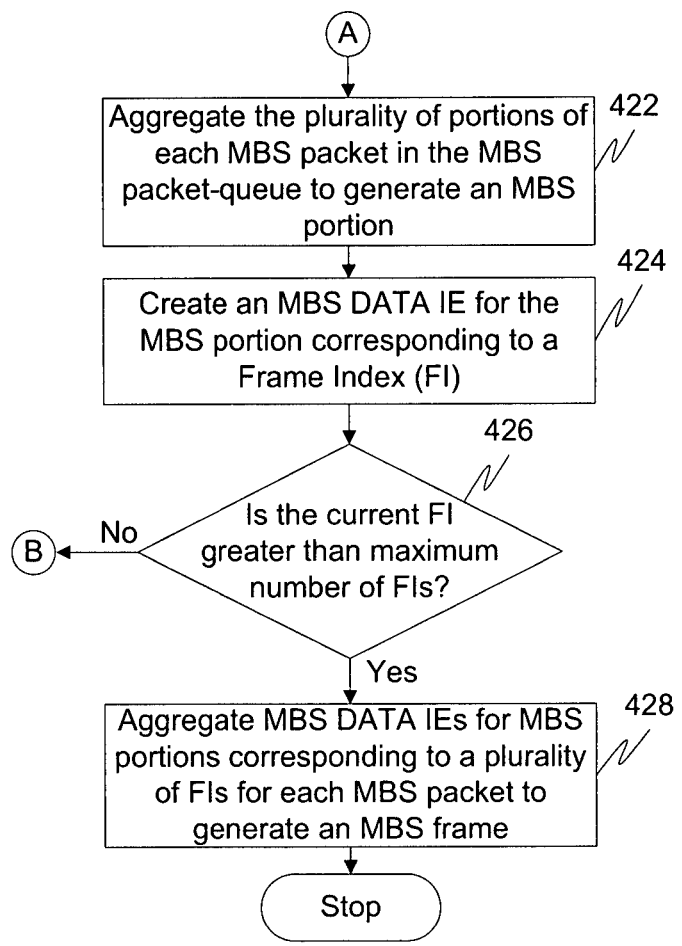

FIGS. 4A and 4B show a flowchart of a method of encoding a MBS frame in a master controller, in accordance with an embodiment of the invention. In this embodiment of the invention, the predefined criterion for transmitting a MBS frame from the plurality of BTSs at the predetermined TOT is a master controller encoding the MBS frame. The master controller is selected from one or more controllers based on a predefined condition, at step 402. In an embodiment of the invention, the master controller is a high capacity controller. For example, controller 104 is selected as the master controller from controller 104 and controller 106, as controller 104 has a higher capacity than controller 106. Therefore, controller 104 encodes one or more MBS frames. Controller 106 is a slave controller in communication with controller 104.

At step 404, the master controller determines a link delay to each BTS and a link delay to each slave controller. Each slave controller further determines the link delay to each associated BTS. For example, controller 104 estimates the link delay to each of BTS 108 and BTS 110 and the link delay to controller 106. Controller 106 further estimates the link delay to associated BTSs (not shown in FIG. 1). Controller 104 is therefore able to determine a link delay from controller 104 to each BTS associated with controller 106. Thereafter, at step 406, the master controller schedules a Final Call (FC) for the MBS frame to be transmitted to the plurality of BTSs. The master controller schedules the same FC for each MBS packet to be embedded in each MBS portion of the MBS frame. A FC for a MBS frame is the time at which the MBS frame is sent to the plurality of BTSs.

At step 408, the master controller determines the predetermined TOT for one or more MBS packets received from MBS provider 102 to be embedded in the MBS frame. The predetermined TOT is greater than a maximum link delay of the master controller to each BTS and each slave controller. For example, link delay of controller 104 to BTS 108 is 16 seconds and the link delay of controller 104 to BTS 110 is 12 seconds. Additionally, the link delay of controller 104 to controller 106 is 4 seconds and the maximum link delay of controller 106 to one or more associated BTSs is 8 seconds. The difference between a TOT of a MBS frame and a FC of the MBS frame is greater than or equal to the maximum link delay of the master controller to the plurality of BTSs. TOT for a MBS frame may be represented by (1):

$$TOT \geq FC + \text{Maximum link delay} \quad (1)$$

For example, controller 104 schedules a FC for a MBS frame as 11:00:00 hrs. Also, the maximum link delay of controller 104 to a BTS is 16 seconds, therefore, TOT for the MBS frame may be greater than or equal to (11:00:00 hrs+16 seconds), i.e., 11:00:16 hrs. This time is rounded to a TOT of a succeeding MBS frame that is transmitted after the MBS frame.

At step 410, the master controller creates one or more MBS packet-queues from one or more MBS packets received from MBS provider 102, which have the predetermined TOT. A MBS packet-queue is created based on a Connection Identifier (CID) assigned to one or more packets in the MBS packet-queue in the master controller. A CID is assigned to a MBS packet based on a service flow ID of the MBS flow, which includes the MBS packet. A service flow ID of a MBS packet, which is determined based on the MBS flow of the MBS packet, is mapped to a CID assigned to the MBS packet in the master controller. Additionally, an Index (IND) is assigned to a MBS packet based on an arrival time of the MBS flow that includes the MBS packet. Therefore, a MBS packet-queue includes a set of MBS packets. Each MBS packet in the set of MBS packets for a MBS packet-queue has the predetermined TOT, the same CID, and the same IND. At step 412, each MBS packet-queue is assigned a CID based on the CID of each MBS packet in a MBS packet-queue. For example, a MBS packet-queue includes three MBS packets, i.e., a first MBS packet, a second MBS packet, and a third MBS packet. Each of the first MBS packet, the second MBS packet, and the third MBS packet belong to the same MBS flow and are assigned the same CID and the same IND. Therefore, the MBS packet-queue is also assigned the CID and the IND of each of the first MBS packet, the second MBS packet, and the third MBS packet.

At step 414, one or more MBS packet-queues, which have the predetermined TOT, are sorted in an ascending order based on a CID assigned. In an embodiment of the invention, one or more MBS packet-queues are sorted in an ascending order based on an IND assigned. At step 416, a counter is initialized to a first CID, for one or more MBS packet-queues sorted in an ascending order based on a CID assigned.

For encoding the MBS frame, at step 418, each MBS packet in a MBS packet-queue, which has a CID corresponding to the counter, is fragmented into a plurality of portions. Each portion is equal to a FS of the MBS frame. A MBS packet is divided into a plurality of portions, if the size of the MBS packet is greater than a FS of the MBS frame. Thereafter at step, 420, the counter is incremented by one, such that, the counter points to a succeeding CID. For example, four MBS packet-queues are created for one or more MBS packets received, which have the same TOT of 11:00:16 hrs, received from MBS provider 102. The first MBS packet-queue is assigned a CID of value one, the second MBS packet-queue is assigned a CID of value two, the third MBS packet-queue is assigned a CID of value three, and the fourth MBS packet-queue is assigned a CID of value four. Thereafter, the four MBS packets are sorted in an ascending order based on the CID assigned. To begin with encoding of the MBS frame, the counter is initialized to the CID of value of one, therefore, each MBS packet in the MBS packet-queue that has a CID of value one is fragmented into a plurality of portions. Thereafter, the counter is incremented by one, such that, the counter points to the CID of value two.

At step 422, the plurality of portions of each MBS packet in the MBS packet-queue are aggregated to generate a MBS portion. The MBS portion includes one or more fragments. A fragment includes one or more parts of one or more MBS packets that are extracted from the same MBS packet-queue. A fragment has a CID value mapped to the service flow ID of a MBS flow, which includes one or more MBS packets associated with the fragment. For example, a fragment in a MBS portion includes one or more parts of one or more MBS packets extracted from the first MBS packet-queue that has the lowest CID value. Thereafter, at step 424, a MBS DATA IE is created for the MBS portion corresponding to a Frame Index (FI). The MBS DATA IE is used to determine the location of the MBS portion in the MBS frame.

Thereafter, at step 426, a check is performed to determine if the current FI is greater than maximum FI. If the current FI is greater than the maximum FI, at step 428, MBS portions generated from each MBS packet and MBS DATA IEs generated corresponding each MBS portion for the plurality of FIs are aggregated to encode the MBS frame. The MBS DATA IEs created for each MBS portion in the MBS frame are aggregated in a MBS MAP for the MBS frame. The MBS frame has the predetermined TOT. After encoding the MBS frame, the master controller transmits the MBS frame to an associated set of BTSs and to each slave controller. Each slave controller further transmits the MBS frame to an associated set of BTSs. Thereafter, the plurality of BTSs transmit the MBS frame at the predetermined TOT. The MBS frame is received by one or more MSs. For example, controller 104 transmits the MBS frame to BTS 108, BTS 110, and to controller 106. Controller 106 further transmits the MBS frame to associated BTSs. Thereafter, each of BTS 108, BTS 110, and set of BTSs associated with controller 106 transmit the MBS frame at the predetermined TOT. One or more of MS 112, MS 114, MS 116, and MS 118 receive the MBS frame.

As the master controller encodes embeds in the MBS frame each MBS portion with corresponding MBS DATA IE, therefore, one or more MSs receiving the MBS frame is able to decode the MBS frame.

Figure 5A:
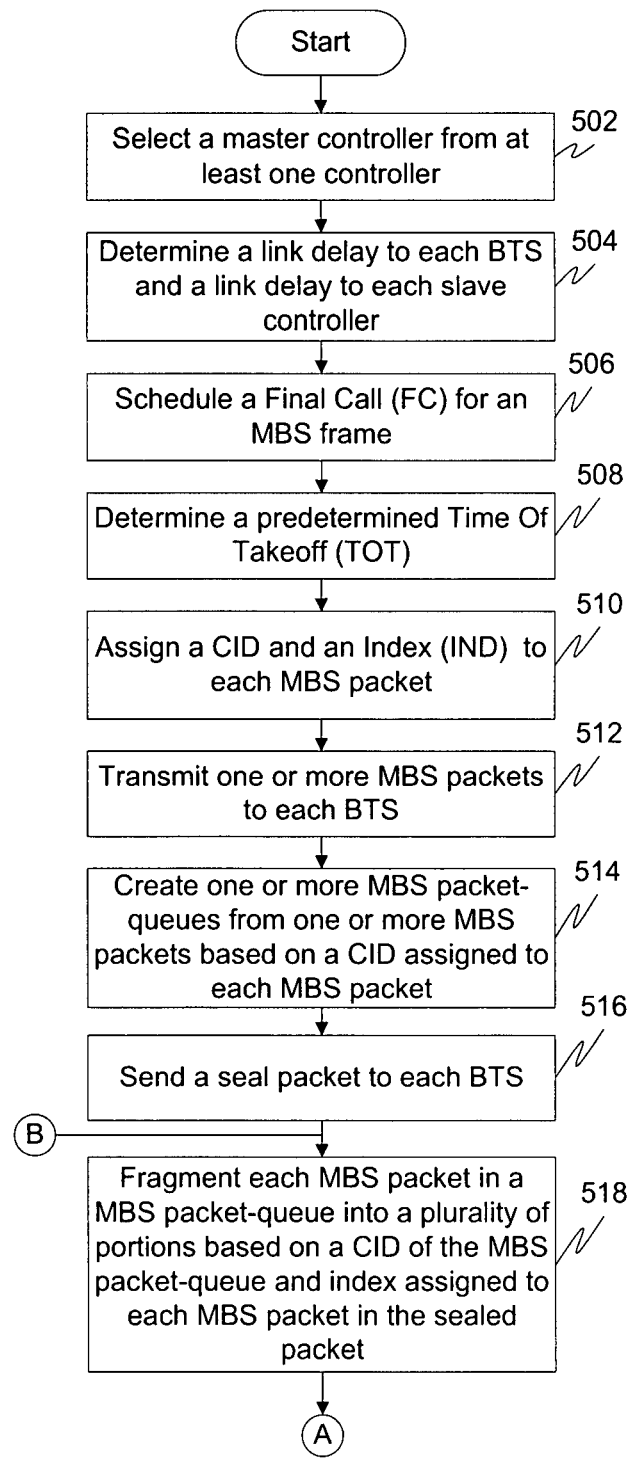
FIGS. 5A and 5B show a flowchart of a method of encoding a MBS frame in a plurality of BTSs, in accordance with an embodiment of the invention.
Figure 5B:
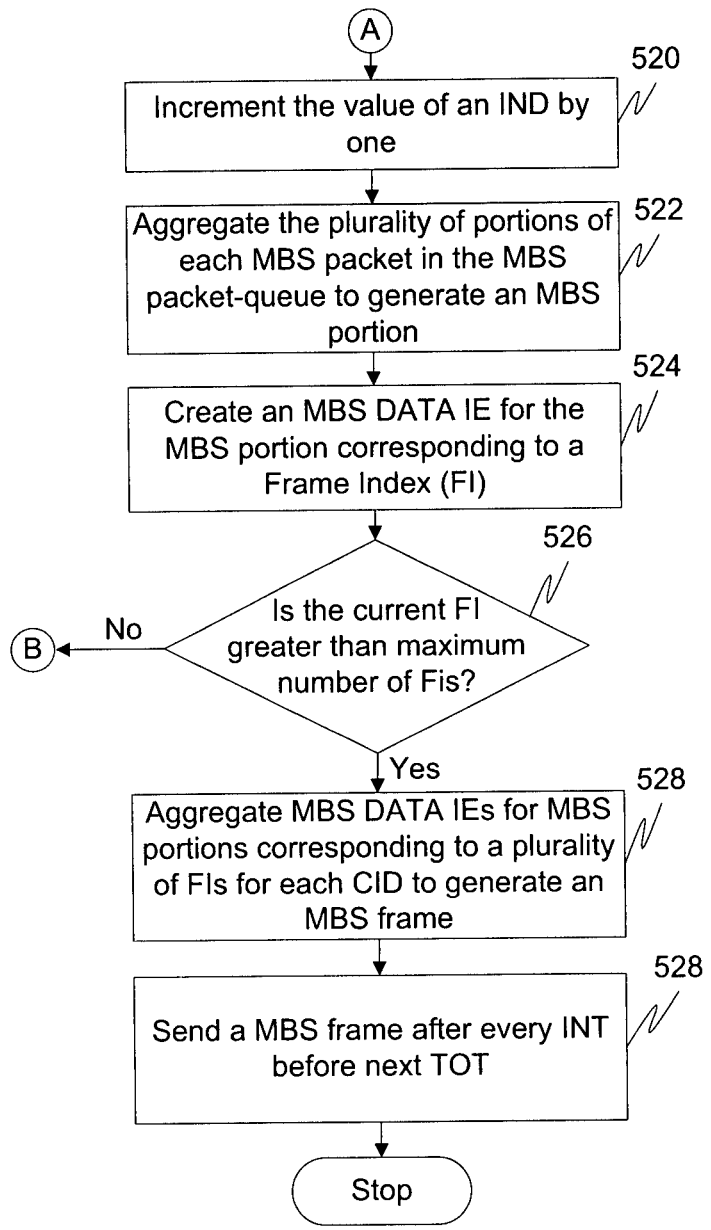

FIG. 5A and 5B show a flowchart of a method of encoding a MBS frame in each BTS, in accordance with an embodiment of the invention. At step 502, a master controller is selected from one or more controllers based on a predefined condition. At step 504, the master controller determines a link delay to each BTS and a link delay to each slave controller. Each slave controller further estimates the link delay to each associated BTS. Thereafter, at step 506, master controller schedules a Final Call (FC) for the MBS frame to be transmitted to the plurality of BTSs. The master controller schedules the same FC for each MBS packet to be embedded in the MBS frame. A FC for a MBS frame is the time at which the MBS frame is sent to the plurality of BTSs. At step 508, the master controller determines the predetermined TOT for one or more MBS packets received from MBS provider 102. The predetermined TOT is greater than a maximum link delay of the master controller to each BTS and each slave controller. This has been explained in detail in conjunction with FIG. 4.

At step 510, the master controller assigns a CID and an IND to each MBS packet based on the service flow ID of the MBS flow of a MBS packet. The CID is mapped to the service flow ID. This has been explained in detail in conjunction with FIG. 4. Thereafter, at step 512, the master controller transmits one or more MBS packets to each BTS based on an Allocated Size (AL) allocated to the MBS frame associated with one or more MBS packets. One or more MBS packets for a MBS portion are transmitted to each BTS such that the combined size of one or more MBS packets does not exceed the AL of the MBS frame. The master controller also sends one or more MBS packet to each slave controller. Each slave controller further sends one or more MBS packet to an associated set of BTSs. In an exemplary embodiment of the invention, the AL may be determined using the expression given by (2).

$$AL = (MFS) * (\text{next TOT} - TOT)/INT \quad (2)$$

Where,
AL is allocated size,
MFS is the size of the MBS frame,
TOT is the Take off time for the MBS frame,
INT is the frequency interval in which the MBS frame is encoded.

At step 514, after receiving one or more MBS packets, each BTS creates one or more MBS packet-queues from one or more MBS packets based on the CID of each MBS packet.

Each MBS packet-queue includes a set of MBS packets. MBS packets that have the same CID are aggregated in a MBS packet-queue, which is assigned the same CID as that of the MBS packets. Therefore, each MBS packet in a MBS packet-queue has the same CID, the same IND, and the predetermined TOT. This has been explained in detail in conjunction with FIG. 4. For example, BTS 108 receives a first MBS packet and a second MBS packet each having a CID value of one, and a third MBS packet and a fourth MBS packet each having a CID value of two. Therefore, BTS 108 creates two MBS packet-queues, the first MBS packet-queue includes the first MBS packet and the second MBS packet and the second MBS packet-queue includes the third MBS packet and the fourth MBS packet. The first MBS packet-queue has the CID value of one and the second MBS packet-queue has the CID value of two based on the MBS packet that they include.

After sending one or more MBS packets for the MBS frame, the master controller sends a sealed packet to each BTS and each slave controller, at step 516. Each slave controller further sends the sealed packet to an associated set of BTSs. The sealed packet includes list of one or more MBS packets sent to each BTS, and information corresponding to the CID, and the IND assigned to a MBS packet. Thereafter, at step 518, each BTS fragments each MBS packet in a MBS packet-queue into a plurality of portions based on a CID of the MBS packet-queue and an IND assigned to each MBS packet in the sealed packet. At step 520, each BTS increments the value of IND by one. This has been explained in conjunction with FIG. 4.

At step 522, each BTS aggregates the plurality of portions of each MBS packet in the MBS packet-queue to generate a MBS portion. Thereafter, at step 524, each BTS creates a MBS DATA IE for the MBS portion corresponding to a FI. This has been explained in conjunction with FIG. 4. At step 526, a check is performed to determine if the current FI is greater than maximum FI. If the current FI is greater than the maximum FI, at step 528, MBS portions generated for each MBS packet and MBS DATA IEs generated corresponding each MBS portion for the plurality of FIs are aggregated to encode the MBS frame. The MBS DATA IEs are aggregated in a MBS MAP in the MBS frame. The MBS frame has the predetermined TOT. The MBS frame is then transmitted by each BTS at the predetermined TOT. At step 530, each BTS sends an MBS frame after every frequency Interval (INT) before the next TOT to consume each MBS packet that has the predetermined TOT.

Figure 6:
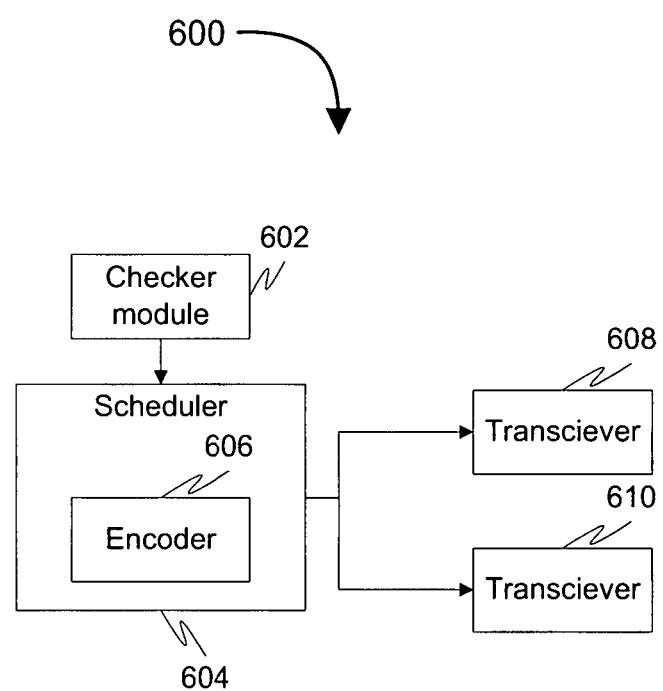
FIG. 6 is a block diagram showing a system for communicating a plurality of packets in a MBS communication network, in accordance with an embodiment of the invention.

FIG. 6 is a block diagram showing a system 600 for communicating a plurality of packets in a MBS communication network, in accordance with an embodiment of the invention. System 600 includes a checker module 602, a scheduler 604, and a plurality of transceivers. In an embodiment of the invention, each of controller 104 and controller 106 include checker module 602 and scheduler 604. Checker module 602 determines if one or more packet in the plurality of packets received by one or more controllers are MBS packets. MBS packets are provided by MBS provider 102. If one or more packets are MBS packets, then scheduler 604 encodes one or more MBS frames using one or more packets that are MBS packets. This has been explained in conjunction with FIG. 2.

For encoding a MBS frame, scheduler 604 determines a link delay to each BTS in the MBS communication network. Based on the maximum link delay to a BTS, scheduler 604 schedules a FC for one or more MBS packets to be embedded in a MBS frame. Thereafter, scheduler 604 schedules a predetermined TOT for the MBS frame based on the maximum link delay to a BTS and the FC for the MBS frame. This has been explained in detail in conjunction with FIG. 4.

To encode a MBS frame, encoder 606 in scheduler 604 embeds one or more parts of one or more MBS packets in one or more MBS portions in the MBS frame. Thereafter, encoder 606 embeds a MBS MAP in the MBS frame. The MBS MAP includes one or more MBS DATA IEs. A MBS DATA IE is associated with a MBS portion. A MBS DATA IE is used to determine each of configuration and the location of the associated MBS portion in the MBS frame. This has been explained in detail in conjunction with FIG. 3.

After encoding one or more MBS frames, each of a transceiver 608 and a transceiver 610 transmit one or more MBS frames to the plurality of MSs at the predetermined TOT based on a predetermined criterion. It will be apparent to a person skilled in the art that more than two transceivers may transmit one or more MBS frames at the predetermined TOT. This has been explained in detail in conjunction with FIG. 4 and FIG. 5. In an embodiment of the invention. BTS 108 includes transceiver 608 and BTS 110 includes transceiver 610.

Each BTS continues to create MBS frame and sends every INT interval until the next TOT. BTS consumes each MBS packet that has the predetermined TOT before the next TOT.

Various embodiments of the invention provide methods and system for communicating a plurality of packets in a MBS communication network. In the MBS communication network, on of a controller and a BTS encode a MBS frame. The MBS frame is transmitted from a plurality of BTSs at a predetermined TOT, thereby, achieving macro diversity in the MBS communication network.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not be construed as a critical, required, or essential features or elements of any or all the claims. The present invention is defined solely by the appended claims including any amendments made during the pendency of this application and all equivalents of those claims as issued.

What is claimed is:

1. A method of communicating in a Multicast Broadcast Service (MBS) communication network, the method comprising:

determining if at least one packet among a plurality of packets received at an at least one controller among a plurality of controllers is a MBS packet, the at least one controller configured to communicate with a plurality of Base Transceiver Stations (BTSs), a master controller being selected from the plurality of controllers, the plurality of controllers including the master controller and at least one slave controller;

encoding at least one MBS frame using the MBS packet;

embedding the at least one MBS frame with at least one MBS portion, the at least one MBS portion including at least a part of at least one MBS packet;

further embedding the at least one MBS frame with a MBS MAP, the MBS MAP including at least one MBS DATA Information Element (IE) associated with the at least one MBS portion, the at least one MBS DATA IE being used to determine a configuration and location of the at least one MBS portion in the MBS frame, the at least one MBS frame being divided into at least one fragment among a plurality of fragments, the at least one fragment corresponding to a Fragment Size (FS) of the at least one MBS frame, a size of the at least one MBS portion being equal to the FS of the at least one MBS frame; and transmitting the at least one MBS frame from the at least one BTS to at least one Mobile Station (MS) at a predetermined Take Off Time (TOT) based on a predefined criterion, the predefined criterion including the master controller encoding the at least one MBS frame, the master controller creates at least one MBS packet-queue from the at least one MBS packet, the at least one MBS packet-queue including a plurality of MBS packets, the at least one MBS packet in the at least one MBS packet-queue having the predetermined TOT, the at least one MBS packet-queue being assigned a Connection Identifier (CID) based on a corresponding MBS flow including the at least one MBS packet in the at least one MBS packet-queue.

2. The method of claim 1, further comprising fragmenting each MBS packet in the at least one MBS packet-queue into a plurality of portions based on the CID assigned to the at least one MBS packet-queue, a portion among the plurality of portions being equal to the FS of the at least one MBS frame.

3. The method of claim 2, further comprising fragmenting a MBS packet in the at least one MBS packet-queue into a plurality of portions if the size of the at least one MBS packet is greater than a FS of the MBS portion.

4. The method of claim 3, further comprising aggregating the plurality of portions of the at least one MBS packet in the at least one MBS packet-queue to generate a MBS portion.

5. The method of claim 1, further comprising generating the at least one MBS DATA IE for the MBS portion corresponding to at least one Frame index (FI) among a plurality of FIs.

6. The method of claim 5, further comprising aggregating the MBS portion and the generated MBS DATA IE corresponding to the at least one FI for the CID to generate a MBS frame if a current FI is greater than a maximum number of FIs and the generated MBS frame has the predetermined TOT.

7. The method of claim 1, further comprising sending the at least one MBS frame to at least one slave controller.

8. The method of claim 7, further comprising each of the master controller and the at least one slave controller transmitting the at least one MBS frame to an associated set of BTSs.

9. A method of communication in a Multicast Broadcast Service (MBS) communication network, the method comprising:

determining if at least one packet among a plurality of packets received at an at least one controller among a plurality of controllers is a MBS packet, the at least one controller configured to communicate with a plurality of Base Transceiver Stations (BTSs), a master controller being selected from a plurality of controllers, the plurality of controllers include the master controller and the at least one slave controller;

encoding at least one MBS frame using the MBS packet;

embedding the at least one MBS frame with at least one MBS portion, the at least one MBS portion including at least a part of at least one MBS packet;

further embedding the at least one MBS frame with a MBS MAP, the MBS MAP including at least one MBS DATA Information Element (IE) associated with the at least one MBS portion, the at least one MBS DATA IE being used to determine configuration and location of the at least one MBS portion associated with the MBS DATA IE the at least one MBS frame is divided into at least one fragment among a plurality of fragments, the at least one fragment corresponding to a Fragment Size (FS) of the at least one MBS frame, a size of the at least one MBS portion being equal to the FS of the at least one MBS frame;

transmitting the at least one MBS packet to at least one BTS among the plurality of BTSs based on an Allocated Size (AL) of the at least one MBS frame associated with the at least one MBS packet, a sealed packet is sent to the at least one BTS, the sealed packet including a list of the at least one MBS packet and information corresponding to a Connection Identifier (CID) and index (IND) of the at least one MBS packet; and transmitting the at least one MBS frame from the at least one BTS to at least one Mobile Station (MS) at a predetermined Take Off Time (TOT) based on a predefined criterion, the predefined criterion including the at least one BTS encodes the at least one MBS frame, the at least one BTS creates at least one MBS packet-queue from the at least one MBS packet based on a CID assigned to the at least one MBS packet, the at least one MBS packet-queue including a plurality of MBS packets, the at least one MBS packet in the at least one MBS packet-queue having the predetermined TOT, ND and CID.

10. The method of claim 9, further comprising fragmenting the at least one MBS packet in the at least one MBS packet-queue into a plurality of portions based on the CID of the at least one MBS packet-queue and the IND assigned to the at least one MBS packet in the sealed packet.

11. The method of claim 10, further comprising aggregating the plurality of portions of the at least one MBS packet in the at least one MBS packet-queue to generate a MBS portion.

12. The method of claim 9, further comprising generating the at least one MBS DATA IE for the MBS portion corresponding to at least one Frame Index (FI) among a plurality of FIs.

13. The method of claim 12, further comprising generating the MBS portion and a MBS MAP corresponding to the plurality of FIs for each CID are aggregated to generate the MBS frame, if a current FI is greater than the maximum number of FIs, the MBS frame has the predetermined TOT.

* * * * *

UNITED STATES PATENT AND TRADEMARK OFFICE
CERTIFICATE OF CORRECTION

| | | |
|---|---|---|
| PATENT NO. | : 9,019,888 B2 | Page 1 of 1 |
| APPLICATION NO. | : 11/741776 | |
| DATED | : April 28, 2015 | |
| INVENTOR(S) | : Jalil et al. | |

It is certified that error appears in the above-identified patent and that said Letters Patent is hereby corrected as shown below:

In the Claims

Column 10, Claim 9, line 37, delete "ND" and insert --IND--

Signed and Sealed this
Fifteenth Day of September, 2015

Michelle K. Lee
*Director of the United States Patent and Trademark Office*